United States Patent [19]

Lofgren et al.

[11] 4,067,268
[45] Jan. 10, 1978

[54] DIGGING AND PLANTING MACHINE

[75] Inventors: Stig-Gunnar Lofgren; Bo Gunnar Ekeborg, both of Jarved, Sweden

[73] Assignee: Mooch Domsjo Aktiebolag, Ornskoldsvik, Sweden

[21] Appl. No.: 680,270

[22] Filed: Apr. 26, 1976

[30] Foreign Application Priority Data

Apr. 29, 1975 Sweden .................... 7504949

[51] Int. Cl.² ........................... A01C 11/00
[52] U.S. Cl. ........................... 111/2; 111/89
[58] Field of Search .............. 111/2, 3, 4, 89, 90, 111/91, 92, 93, 94, 95, 96, 97, 98, 99; 172/4.5, 261, 430

[56] References Cited

U.S. PATENT DOCUMENTS

| 1,773,451 | 8/1930 | Etchison et al. | 111/4 |
| 2,023,053 | 12/1935 | Kugel | 172/430 |
| 2,625,122 | 1/1953 | Carelock | 111/3 |
| 2,776,633 | 1/1957 | Bible | 111/3 |
| 3,943,863 | 3/1976 | Leonard et al. | 111/2 |
| 3,972,294 | 8/1976 | Grundström et al. | 111/91 |

FOREIGN PATENT DOCUMENTS

| 500,615 | 3/1954 | Canada | 172/430 |
| 2,455,759 | 6/1975 | Germany | 111/3 |
| 2,531,478 | 3/1976 | Germany | 111/2 |
| 577,411 | 5/1958 | Italy | 172/430 |

*Primary Examiner*—Edgar S. Burr
*Assistant Examiner*—James R. Feyrer

[57] ABSTRACT

A digging and planting machine is provided having a tubular digging and planting tool, and means for compacting earth around the plant after planting, movable between ground-contacting and ground-elevated positions, the compacting means carrying the tubular digging and planting tool, and being movable into an earth-compacting position when the digging and planting tool is in a ground-elevated position.

14 Claims, 5 Drawing Figures

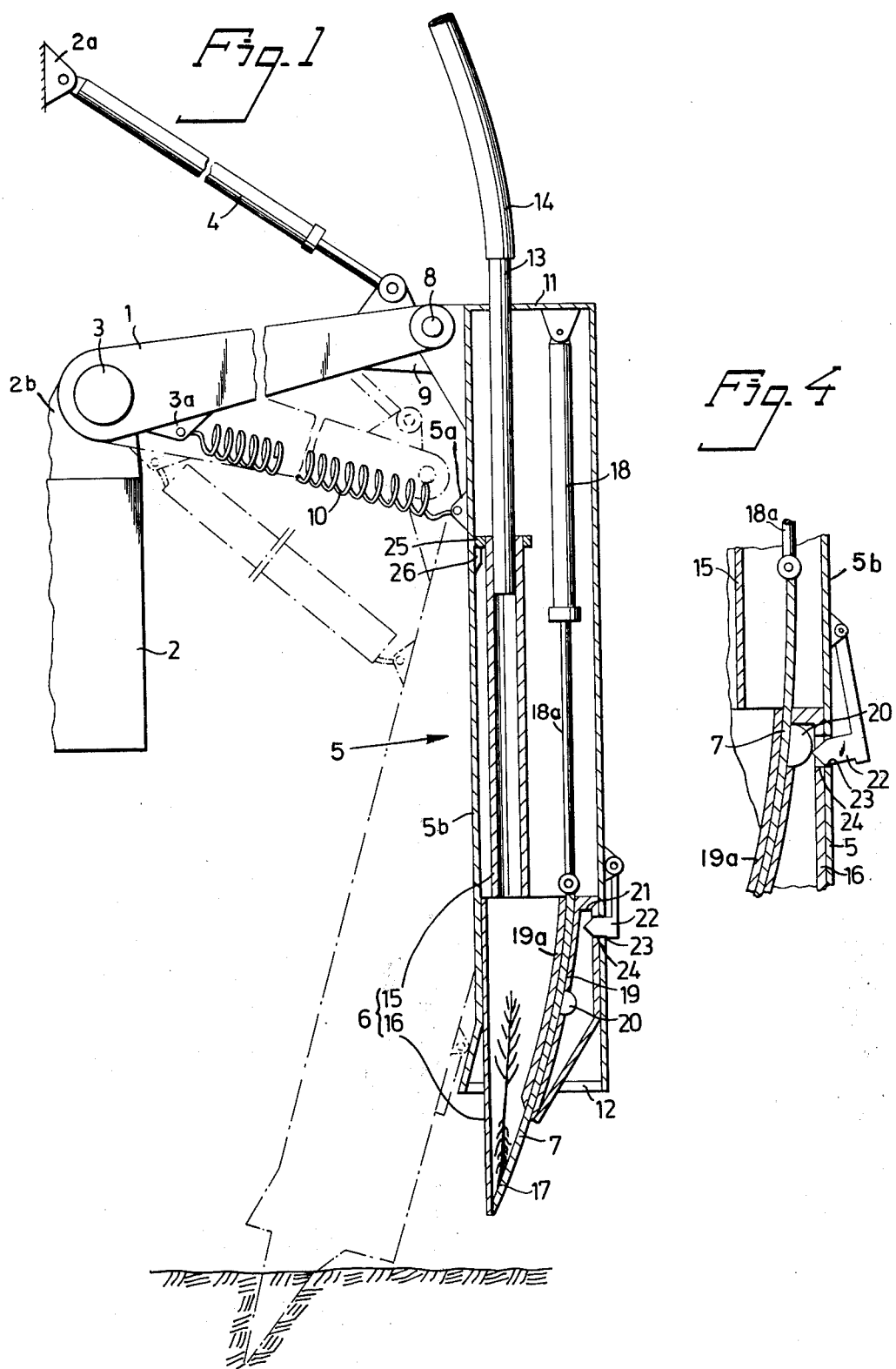

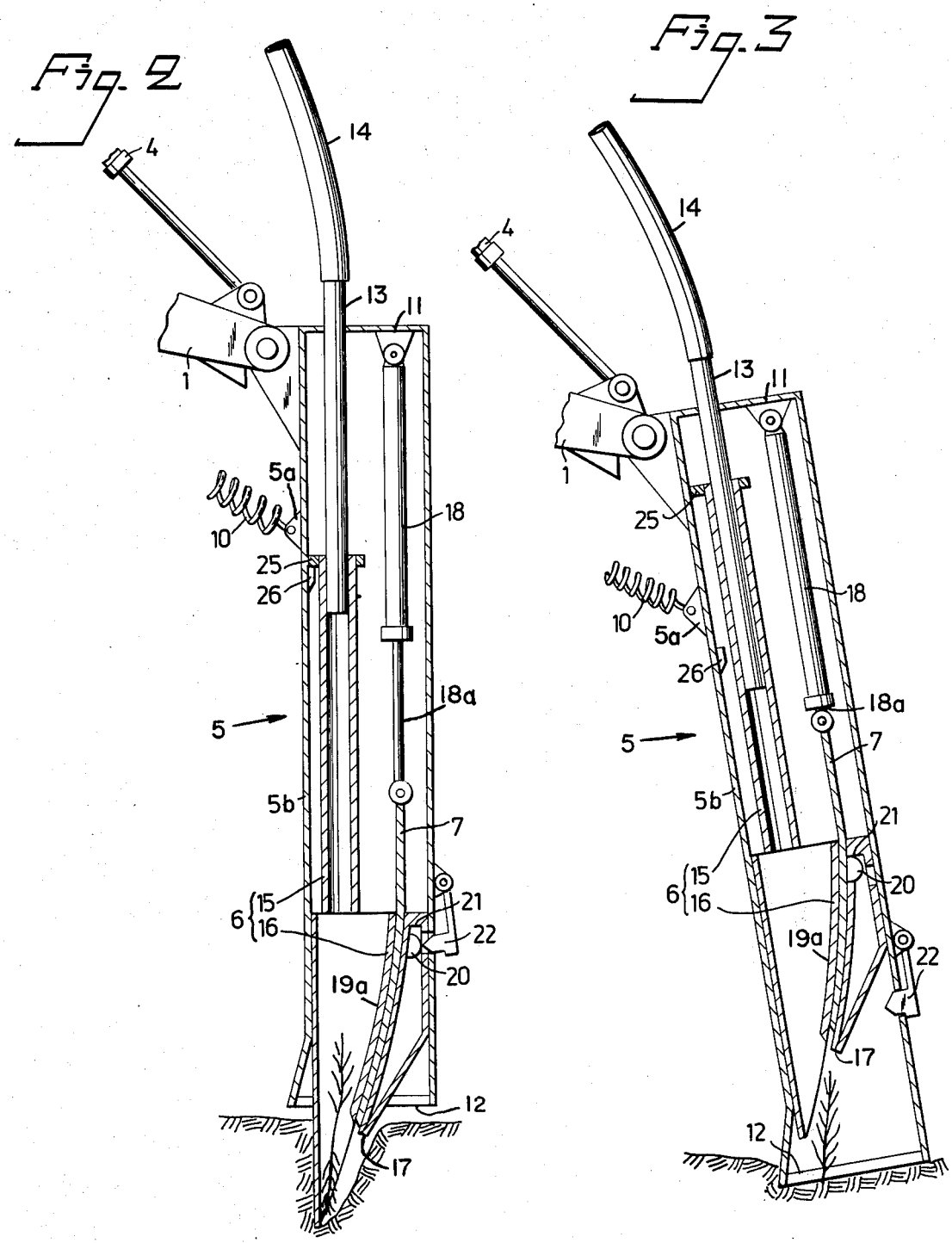

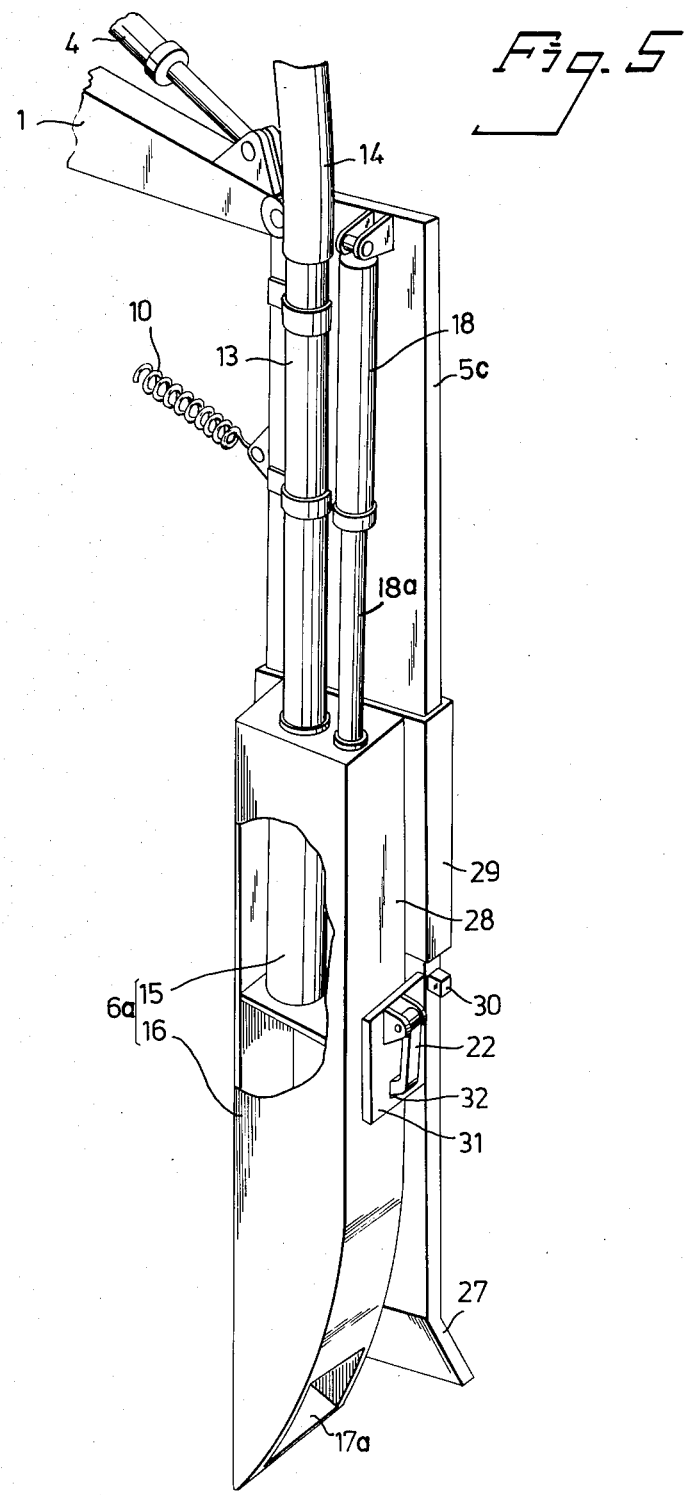

DIGGING AND PLANTING MACHINE

Planting machines are now widely used reforestation of cut or burned over or otherwise barren forest land. Frequently, however, the machines fail to set the plants in deeply enough, and as a result the plants do not grow well and may die. This problem is due to the presence of obstacles in the ground, such as stones, stubs, large roots and the like, which prevent the digging devices of the planter from penetrating deeply enough into the ground.

To ensure that each plant is set to a proper depth, it is necessary to measure accurately the depth of the hole in which the plant is to be set, and transfer the plants from the machine to a hole only when the hole is deep enough. Devices for measuring or sensing the depth of a hole in which a plant is to be set are normally constructed so that the digging tool itself measures the depth of the hole, with the surface of the ground as a reference surface for a slide shoe or the like connected with said digging tool, and moved along said surface of the ground. However, such a device can give a signal for transferring a plant from the planting apparatus to the intended hold when the hole is too shallow, if the slide shoe becomes positioned at a higher level than the ground, on a raised stone or some other obstacle at the same time as the digging tool digs into the ground. In such a case the vertical distance between the upper surface of the obstacle and the point of the digging tool is the sum of the elevation of the object above the ground and the resulting depth of the hole, and the correct depth is signaled when the hole is too shallow.

There are two main types of reforestation or planting machines: those provided with tubular hole-making devices, and those provided with tubular plowing devices, which dig a furrow that has the hole at a deep end or portion thereof. Both of these devices operate intermittently. The tubular plowing device has a number of serious disadvantages. Such devices take longer to plow a hole and plant a plant than the short time from 2 to 4 seconds allotted for each single planting operation, due to the fact that the feed-out end of the planting tool is either substantially planar or slightly V-shaped. Consequently, the planting means, despite its simultaneous forward movement, encounters a high degree of resistance when moved into the ground.

The planting device upon being moved into the ground also may rest on a branch or the like extending in the direction of movement by the planting machine, when the planting apparatus is preceded in its forward movement path by a ground-preparing scarifying wheel or the like. Branches picked up by the wheel are moved to beneath the planting device, thereby delaying the insertion of said device into the ground, so that a plant is either fed from the planting machine too early, or not at all.

Another disadvantage of tubular plowing devices is that, even when the devices are arranged to be inserted into the ground with an oblique, downward movement, the earth tends to penetrate the plant exit opening of the planting device, and makes feeding of the plants through the opening difficult. The reason why earth penetrates the planting tube is that the downwardly facing opening of the tubular planting device is either substantially horizontal or is inclined to the surface of the ground at an angle which is smaller than the angle formed between the movement path of the planting device and the surface of the ground.

In accordance with Ser. No. 526,278 filed Nov. 22, 1974, now U. S. Pat. No. 3,998,171, patented Dec. 21, 1976, to Lofgren and Moberg, a pneumatic depth indicator is provided on the digging tool. The planting machine of that invention comprises, in combination a digging tool; a vehicle carrying the digging tool; and a depth indicator in operative association with the digging tool, signalling when the digging tool has reached a predetermined depth for a plant to be transferred from the machine, the depth indicator comprising at least one gas conduit for conveying a gas under superatmospheric pressure from one end to the other thereof the one end being adapted to be connected to a gas supply, the other end being open to the atmosphere and spaced a vertically projected distance from the tip of the digging tool equal to the depth of the hole dug by the tool for a plant, and so arranged that the opening to atmosphere is plunged into blocking contact to the earth when the predetermined hole depth is reached, thereby halting flow of gas from the conduit.

A further problem with some types of tubular plowing devices having an open digging tip end is, that a plant cannot be placed in the tube until the planting site has been selected by the operator, and the tube is located over it. Since many suitable planting sites are not greater than about 0.5 to 1 m² in area, at excessive vehicle speeds the planting tube is liable to pass the planting site, or to be located over a place where the depth of earth is not favorable, before the plant can be delivered from the tube. To reduce this risk, it has been necessary to drive the machine at a relatively low forward speed, which greatly reduces the planting capability of the machine.

Another problem is that the open tip end of the tool can strike hard against stones and other obstacles in the ground, resulting eventually in a sufficient deformation of the tip end to render it unserviceable. This has limited the speed at which the planting tool can be inserted into the ground.

In accordance with Ser. No. 601, 557, filed Aug. 4, 1975, to Logren, a planting machine is provided which reduces the distance through which a plant must travel at the actual moment of planting, and increases the speed at which the digging and planting tube can dig a hole and plant a plant without danger of obstruction. The digging and planting machine according to the invention comprises at least one tubular digging and planting tool, movable between ground-contacting and ground-elevating positions, and having an open digging and planting tip end; closure means movable between a first position closing off the open end for digging a hole and a second position exposing the open end for delivery of a plant from the planting tool into the hole; and means for compacting earth around the plant after planting.

The closure means makes it possible to retain a plant in the tool at the exit opening while a hole is being dug by the tool, so that a plant can be held in a position of readiness, adjacent the exit opening, for delivery to the hole as soon as it is dug. Because of the relatively short path through which the plant has to move when discharged from the tool, the machine can be advanced at a relatively high speed, without risk of the plant landing outside the planting site when the closure is opened, and it is discharged from the tube.

Furthermore, since the exit opening of the tube is closed while the tip is digging a hole, earth, stones, wood and other objects cannot enter the tube, and obstruct delivery of the plant to the hole.

In the apparatus of Ser. No. 526,278 now U.S. Pat. No. 3,998,171, patented Dec. 21, 1976, and Ser. No. 601,557, the digging and planting tool is mounted for movement towards and away from contact with the ground and can be biased into contact with the ground, for example, by a spring, or by a hydraulic cylinder, to complete the planting of the plant while the vehicle is still moving. Also mounted on the digging and planting tool is means for compacting earth around the plant after planting. This means can for example be moved axially along the digging and planting tool by means of a hydraulic cylinder. As the vehicle continues to move forward, the digging and planting tool and compacting means move rearwardly, and continue to be pressed against the ground, while being held in position at the planting site by the ground. The bias means, i.e., spring or telescopic arm, is extended correspondingly, by temporarily decreasing the biasing force.

When the compacting means is pressed against the ground by its hydraulic cylinder, the digging and planting tool and the lifting arm are rapidly moved upwards. This upward movement starts immediately after the plant is fed to the planting cavity. A problem however is that the mass of the compacting means is less than the combined mass of the digging and planting tool, and the mechanism for moving the tool towards and away from the ground. Thus, the kinetic energy of the upwardly moving parts is converted into an upwardly directed force at the very moment that the hydraulic cylinder is fully extended. This upwardly directed force reduces the force holding the compacting means against the ground. This results in the compacting means not pressing against the ground, but sliding along the ground for some distance from the hole, in the direction of movement of the vehicle, so that the compacting is effected not at the plant site, but some distance away.

In accordance with the present invention, this difficulty is overcome by having the compacting means carry the digging and planting tool, rather than vice versa, so that the mass of the compacting means and the mechanism for moving it combine to more than offset the mass of the digging and planting too, and the kinetic energy differential between the moving parts is downward, when the digging and planting tool is withdrawn from the ground. The digging and planting tool carried by the compacting means is arranged to be movable between ground-contacting and ground-elevated positions, while the compacting means is also arranged to be movable between ground-elevated and earth-compacting positions, so that the compacting means can compact the earth while the digging and planting tool is in an elevated position, and the digging and planting tool can be arranged to dig a hole and plant a plant while the compacting means is in the ground-elevated position.

Because of the increased mass of the compacting means, the pressure exerted by the compacting means against the earth is substantially unchanged at the moment when the upward movement of the digging and planting tool stops. This means that the earth is compacted by the compacting means at the intended position, adjacent to the plant.

The planting machine in accordance with the invention comprises, in combination, a vehicle, and, carried on the vehicle, a tubular digging and planting tool having an open digging and planting tip end, for digging a hole and conveying a plant to the hole; means for compacting earth about the plant after it has been deposited in the hole; and means for moving the digging and planting tool and the compacting means separately and together between ground-elevated and ground-contacting position; the digging and planting tool being reciprocably mounted on he compacting means, for movement towards and away from a ground-contacting position for digging a hole for a plant to be transferred from the machine, and the compacting means being reciprocably mounted on the vehicle, for movement towards and away from a ground-contacting position for compacting earth about the plant simultaneously with withdrawal of the digging and planting tool.

In a preferred embodiment, the planting machine has a depth indicator on the digging and planting tool, signalling when a hole of a predetermined depth has been dug. A suitable depth indicator is described in Ser. No. 526,278, now U.S, Pat. No. 3,998,171, patented Dec. 21, 1976, the disclosure of which is hereby incorporated by reference.

In a further preferred embodiment, alternatively or in combination with the depth indicator feature, the open tip end of the digging and planting tool comprises closure means movable between a first position closing off the open end for digging a hole, and a second position exposing the open end for delivery of a plant from the planting tool into the hole. Suitable closure means is described in Ser. No. 601,557, the disclosure of which is hereby incorporated by reference.

The means for moving the closure means between end-open and end-closed position, such as a piston and hydraulic cylinder, can be arranged at the same time to reciprocate the digging and planting tool alone or together with the compacting means, between ground-elevated and ground-contacting position, and vice versa.

The drawings illustrate preferred embodiments of the invention.

FIG. 1, is a side view of a digging and planting machine having the tubular digging and planting tool arranged reciprocably within a tubular compacting means, and showing the machine in the first operating step, about to make a planting hole in the ground, carrying a plant ready to drop in; with the position of the machine in the second operating step, after the hole is dug, shown in dashed lines;

FIG. 2 is a side view of the machine of FIG. 1, showing the third operating step of feeding a plant into the hole, after withdrawal of the closure means;

FIG. 3 is a side view of the planting machine showing the fourth operating step with the compacting means in the position of compacting the earth around the plant; after which the compacting means is withdrawn into the position shown in FIG. 1;

FIG. 4 is a detailed view of the mechanism effecting relative movement of the digging and planting tool and the compacting means; and FIG. 5 is a side view of another embodiment of digging and planting machine having the tubular digging and planting tool arranged reciprocably outside a flat bar-shaped compacting means.

The digging and planting machine shown in FIGS. 1 to 4 comprises a vehicle 2, on which the machine is mounted. A lifting arm 1 is pivotably mounted on a shaft 3, which is attached to the vehicle at 2b, and extends parallel with the wheel axles of the vehicle, and moves the compacting means 5 between ground-contacting and ground-elevated positions. The digging and planting tool 6 is moved between ground-contacting and ground-elevated positions by the combined movement of lifting arm 1 and reciprocating movement along the compacting means 5.

Pivoting of the lifting arm 1 on shaft 3 is effected by a hydraulic piston and cylinder 4, pivotably mounted at 2a between the vehicle 2 and the lifting arm.

Reciprocably mounted within the tubular earth compacting means 5 is the digging and planting tool 6, comprising a plant feed tube 15 leading into a planting and digging tip 16 open at 17 for discharge of plants at the bottom thereof. A reciprocable closure 7 closes off the opening 17 of the digging tip.

The compacting means 5 is pivotably mounted on the free end of the lifting arm 1 on a pivot pin 8, and can be swung from an obliquely downward position, as shown in solid lines in FIG. 1, to a forwardly directed position, as shown in dashed lines in FIG. 1, and to a rearwardly directed position, as shown in FIG. 3. In the forwardly directed dashed-line position of FIG. 1, further forward pivoting movement of the compacting device is stopped by an abutment 9 on the lifting arm. A tension spring 10 is arranged between the lifting arm at a point 3a near shaft 3 and the compacting means at 5a, and biases the same towards the abutment 9.

The compacting means 5 comprises a relatively wide tube 5b which is closed at the top 11, and which is provided at its lower end with a compacting collar 12. The collar has the shape of a horseshoe in cross-section, with the open portion facing rearwardly.

The digging and planting tool 6 includes a plant supply tube 14 leading to the plant feed tube 13, attached to the top 11 of the tube 5b; tube 13 extends within the tube 5b to the second feed tube 15, leading to digging tip 16. The flexible plant supply tube 14 is connected to a plant supply on the vehicle 2 (not shown in the FIGS.), from which the plants may be fed to the tube 14, one at a time, manually or automatically.

The reciprocating parts of the digging and planting tool 6 comprise the feed tube 15, which in fact moves telescopically over tube 13, serving as a core support and guide or track, and tip 16. The tip 16 has an obliquely downwardly and rearwardly facing opening 17, which can be opened and closed by reciprocation of the flap 7. The flap at one end 7a is attached to the end of the piston 18a of the hydraulic cylinder 18, which is pivotably mounted to the top 11 of the compacting tube 5b.

The flap 7 is slightly curved, and moves along a correspondingly curved guide 19a in slot 19 in the digging tip 16. The flap has a shoulder 20 at a central portion, and this shoulder upon a sufficient retraction of the hydraulic piston 18a comes into contact with another shoulder 21, when the flap has exposed the opening 17. Upon continued upward movement of the piston 18a, the flap and with it the digging tip 16 move upwardly, relative to the compacting means 5, due to engagement of the shoulder 20 with the shoulder 21 on the digging tip.

The compacting tube 5b carries at its lower end a pivotably mounted L-shaped pawl 22. This pawl is biased by a torsion spring (not shown) into the aperture 23 of the tube 5b and aperture 24 of the digging tip 16. In this way, the compacting means 5, the digging tool 6 and the digging tip 16 are locked securely together, for combined reciprocation between ground-elevated and ground-contacting positions. However, the pawl 22 is disengaged when the flap 7 is drawn upwardly from its closed position by the hydraulic piston 18a. Upon passing the pawl 22, the shoulder 20 moves the pawl out of the aperture 24, as seen in FIG. 4. This permits the digging tip to move into the ground-elevated position relative to a stationary compacting means, shown in FIG. 3. Mounted on the end of guide sleeve 15 of the planting tube is a flange 25 which, when the digging tip 16 occupies its lower limiting position, lies against a stop 26, arranged in the compacting tube 5b. This stop limits the downward movement of the digging tip 16, relative to the compacting means 5, to that shown in FIG. 1 and 2.

The apparatus functions in the following manner:

First, the flap 7 is moved over the discharge opening 17 in the digging tip 16, closing it, and the digging tip is moved by piston 18a to its lower limiting position (shown in FIG. 1) on the compacting tube 5b, in which the tip 16 is locked securely to the compacting tube 5b by pawl 22. A plant is then dispatched manually or automatically through the tubes 14, 13, 15, and comes to rest on the flap 7. While the vehicle is being driven continuously over the planting area, the driver examines the ground for a suitable planting site. During the time, the digging and planting tool is held lifted above the surface of the ground, as shown in solid lines in FIG. 1.

When the planting tube comes over a suitable planting site, the driver actuates the hydraulic cylinder 4, so as to rapidly extend the piston 4a. This moves the arm 1, tube 5b, and digging tip 6 down to the ground, in a direction extending obliquely downwardly and forwardly, as shown by the dashed lines in FIG. 1, with the digging tip extended. Accordingly, the digging tip penetrates the ground, and when it has reached the intended depth, the hydraulic cylinder is released. The depth can be gauged manually by the driver, or it can be done automatically, by means of a depth indicator, in accordance with application Ser. No. 526,278. The digging tip 16 remains in the hole thus made, due to the weight of the array (the lifting arm 1, tube 5b, and associated components).

As the vehicle continues to move forward, the compacting means 5 is pivoted rearwardly, on the pivot pin 8, against the force of the spring, while the tip 16 of the planting tool remains in substantially the same position on the ground, as seen in FIG. 2. After the planting tool has been pivoted rearwardly through a predetermined angle, the driver exhausts the hydraulic cylinder 18, so that piston 18a and with it the flap 7 move rapidly upwards, withdrawing the flap, and opening the discharge opening 17. Alternatively, a limiting position switch mounted on the lifting arm 1 can be actuated to exhaust the hydraulic cylinder. The plant then falls into the hole that has been dug.

The shoulder 20 arranged on the flap moves the pawl 22 to one side as the flap is withdrawn, so that the digging tip 16 is no longer locked to the compacting tube 5b, as seen in FIG. 4. After the shoulder 20 comes into abutment with the shoulder 21 on the digging tip, the digging tip and sleeve 15 are lifted upwardly to their upper limiting position on the compacting tube 5b, while the plant remains in the hole.

At the same time as the planting tube begins to move upwards, the lifting arm 1 and the compacting tube 5b and collar 12 move downwardly through a corresponding distance under the force of gravity, until the compacting collar 12 rests on the surface of the ground, supporting the weight of the entire apparatus and the lifting arm 1. Before the digging and planting tool 6 has reached its upper limiting position on the compacting tube 5b, the hydraulic cylinder 4 may be actuated for a short period of time to forceably press the lifting arm and the compacting means downwardly, thus pressing the earth around the plant in the planting hole, compacting it, and completing the planting. At this stage of the planting sequence, the apparatus has been pivoted rearwardly against the force of the spring 10 to the position shown in FIG. 3, as a result of the continued forward movement of the vehicle.

After the earth around the plant has been compacted, the hydraulic cylinder 4 is exhausted, whereupon the digging and planting tool 6 and the compacting means are rapidly lifted from the surface of the ground into the ground-elevated position, seen in FIG. 1, thus returning to the starting point. Since the opening of the compacting collar 12 faces away from the direction of movement of the vehicle, this lifting of the digging and planting tool 6 and compacting means 5 does not disturb the plant. When the lifting arm 1 and the digging and planting tool 6 reach their upper limiting positions, the hydraulic piston 18 is extended, so that the digging and planting tool 6 is again brought to its lower limiting position on the compacting device, and the flap 7 closes the outlet opening 17 on the digging tip 16. The machine is then ready for a further planting operation.

When the digging and planting tool is within the compacting tube, as shown in FIGS. 1 to 4, the moving surface are well protected against the entry of dirt and other obstructions. It is however also possible to arrange the plant digging and planting tool on the exterior of the compacting means. This embodiment is shown in FIG. 5.

In the device of FIG. 5, the compacting means 5c has the shape of a bar that a is rectangular in cross-section, and its lower end portion is bent sideways, to constitute a compacting plate 27. The planting tool 6a is the same as that shown in FIGS. 1 to 4, except that it is provided with a box-shaped plant feed tube 28, attached to a bracket 29. The bracket 29 extends around the compacting bar, and guides the digging and planting tool 6a in a manner such that the digging and planting tool can be moved towards and away from the ground along the exterior of compacting bar 5c by means of the piston 18a of hydraulic cylinder 18. The downward movement of the digging and planting tool 6a along the compacting bar 5c is limited by a stop 30 secured to the compacting bar. A mounting plate 31 is secured to the compacting bar and carries a pivotable latch hook 22. The hook 22 projects into an aperture 32 in the plate 31, enabling the compacting bar to be locked to the digging and planting tool 6a, in a way similar to that described above. The apparatus operates in substantially the same way as the apparatus of FIGS. 1 to 4, except that the compacting plate 27 compacts the soil only on one side of the plant, and not around the plant.

The invention is not limited to the described and illustrated embodiments, but can be modified within the scope of the claims. For example, the digging and planting tool and the compacting means need not be pivotably mounted on a lifting arm, as shown. They can equally well be arranged on an arm which can be folded in the direction of movement of the vehicle, or a telescopic arm can be provided, so that when the arm is extended, the digging and planting tool and compacting means are held at the hole during the planting operation. It is also possible to pivotably mount the digging and planting tool and compacting means on the vehicle by means of a folding scissors-linked extension arm which at one end thereof supports the digging and planting tool and compacting means, and at the other end thereof is pivotably mounted on the vehicle, so that the digging and planting tool retains its vertical orientation during each pivoting movment.

The digging and planting tool can also be pivotable in the horizontal plane, in addition to pivotable movement in the vertical plane, as shown in the drawings, for example, by causing the lifting arm to be pivotable both in the vertical and in the horizontal planes. In this way, it is possible to adjust the downward pressure exerted by the digging and planting tool in the presence of obstacles in the ground, and to submit the digging and planting tool to move to one side, as a result of pressures applied by obstacles in the ground.

The digging and planting tool and the compacting means can be curved. Such an embodiment provides a certain degree of freedom in construction of the apparatus and the base vehicle. The transport distance from the plant supply to the supply tube 15 can be shortened in this arrangment, and this enables the apparatus to be adapted for use on a high vehicle.

The flap of the illustrated device makes it possible to retain a plant in the tool at the exit opening while a hole is being dug by the tool, so that a plant can be held in a position of readiness, adjacent the exit opening, for delivery to the hole as soon as it is dug. Because of the relatively short path through which the plant has to move when discharged from the tool, the machine can be advanced at a relatively high speed, without risk of the plant landing outside the planting site when the closure is opened, and it is discharged from the tube.

Furthermore, since the exit opening of the tube is closed while the tip is digging a hole, earth, stones, wood and other objects cannot enter the tube, and obstruct delivery of the plant to the hole.

In one advantageous embodiment of the invention, the closure means is in the form of a movable plate, arranged so that when in the closed position, the plate extends beyond the tip of the planting tool, and protects the point during when the digging or while in contact with the ground. In this way, the tip end of the tube is prevented from striking against stones and other obstacles liable to deform the tube, and it is possible to dig with the tube at a higher speed than was previously possible. A particularly high digging speed can be obtained with one embodiment of the invention, in which the plate is swung into its closing position.

The design of the digging tip end is conventional, and any available tip can be used. In accordance with a preferred embodiment of the invention, the digging tool is a tube whose digging end is cut off at an angle of less than 45° and preferably less than 30° to the axis of the tube, producing a sharp tip with an opening of oval configuration and downwardly curved, as seen in the direction of travel of the tool while digging, with the long axis of the oval-shaped end being vertically directed and being from about 2.5 to about 6, preferably from 3 to 4, times longer than the short axis. This design of digging tool tip gives better digging in the presence of obstacles such as branches, stones, and similar solid objects. This increases digging speed, and in combination with a rapidly operating depth indicator, gives a high planting rate.

The sides of the plant delivery opening are preferably in the same plane and shaped to receive the closure means. The closure means can be a flat or curved plate movable between closing and open positions across and away from the opening. The closure means can be reciprocated, swung or pivoted between closing and open positions.

The present invention is particularly suitable for the hole-type and plowing-type planting devices having a digging tool arranged to be inserted into the ground along a straight or arcuate path to make a hole or to plow a furrow, said paths being directed obliquely downwards and forwards, in the direction of movement of the vehicle carrying the device. The discharge end of the digging tool in cut obliquely downwardly and forwardly in the direction of movement of the vehicle, in a plane which, during the whole of the insertion movement of the planting device or during the latter part of said movement, is inclined more steeply than the direction in which the digging tool in inserted into the ground. The tip of the digging tool is placed so that the leading side is solid tube, and the oval opening faces rearwardly.

The tension spring between the compacting means and the lifting arm for the return movement of the digging and planting tool, can also be modified. It can, for example, be replaced with a hydraulic force accumulator for single or double operating control.

In the illustrated embodiment, the apparatus is provided with a plant hole making, digging and planting tool. However, the digging and planting tool can be replaced with a hollow planting plow of known construction, which is reciprocably arranged.

Having regard to the foregoing disclosure, the following is claimed as inventive and patentable embodiments thereof:

1. A digging and planting machine comprising, in combination, a vehicle, and, carried on the vehicle, a tubular digging and planting tool having an open digging and planting tip end for digging a hole and conveying a plant to the hole; means for compacting earth about the plant after it has been deposited in the hole; means for moving each of the digging and planting tool and the compacting means separately, between ground-elevated and ground-contacting positions; and means for moving the digging and planting tool and the compacting means together between ground-elevated and ground-contacting positions; the digging and planting tool being reciprocably mounted on the compacting means for movement towards and away from a ground-contacting position for digging a hole for a plant to be transferred from the machine, and the compacting means being reciprocably mounted on the vehicle, for movement towards and away from a ground-contacting position for compacting earth about the plant simultaneously with withdrawal of the digging and planting tool.

2. A digging and planting machine in accordance with claim 1, comprising a depth indicator on the digging and planting tool, signalling when a hole of predetermined depth has been dug.

3. A digging and planting machine according to claim 1, having the digging and planting tool reciprocably mounted within the compacting means.

4. A digging and planting machine according to claim 1, having the digging and planting tool reciprocably mounted outside the compacting means.

5. A digging and planting machine according to claim 1, in which the digging and planting tool is a tube having a digging tip end extending at an angle of less than 45° to the axis of the tube, with a sharp tip.

6. A digging and planting machine according to claim 1, in which the digging and planting tool is arranged to be inserted into the ground along a path directed obliquely downwards and forwards in the direction of movement of the vehicle carrying the digging and planting machine.

7. A digging and planting machine according to claim 6, in which the digging tool is a tube having a central passage through which plants can be fed to a hold dug by the tool, and the tip of the digging tool is placed so that the leading side is solid tube, and an opening faces rearwardly.

8. A digging and planting machine in accordance with claim 1, in which the open digging and planting tip end of the digging and planting tool comprises closure means movable between a first position closing off the open end for digging a hole, and a second position exposing the open end for delivery of a plant from the planting tool into the hole.

9. A digging and planting machine according to claim 8 having coupling means connecting the compacting means, the digging and planting tool, and the closure means, in a manner such that when the closure means is moved in one direction, towards the closed position, the compacting means and the digging and planting tool are coupled to move together, and when the closure means is moved in the other direction, towards the open position, the digging and planting tool and compacting means are uncoupled, to move separately.

10. A digging and planting machine according to claim 8, in which the digging tool is straight and the closure means a curved plate.

11. A digging and planting machine according to claim 9, in which the coupling means comprises a pawl pivotable into and away from a coupling position.

12. A digging and planting machine according to claim 8, comprising piston means for moving the closure means between tip end-open and tip end-closed positions.

13. A digging and planting machine according to claim 12, in which the closure means is a plate.

14. A digging and planting machine according to claim 8, in which the digging tool is arcuate and the closure means a curved plate.

* * * * *

UNITED STATES PATENT OFFICE
CERTIFICATE OF CORRECTION

Patent No. 4,067,268  Dated January 10, 1978

Inventor(s) Stig-Gunnar Lofgren et al

It is certified that error appears in the above-identified patent and that said Letters Patent are hereby corrected as shown below:

Face page, [73] Assignee, "Mooch" should be --Mo och--.
Column 1, line 25, "hold" should be --hole--.
Column 2, lines 5 to 21, should not be in bold face type.
          line 14, insert --end-- after "other".
          line 47, "the" should be --that--.
          line 50, "elevating" should be --elevated--.
Column 3, line 44, "too" should be --tool--.
Column 4, line 6, "he" should be --the--.
          line 31, "position" should be --positions--.
          line 56, "movement" should be --movements--.
Column 6, line 23, "the" should be --this--.
Column 7, line 30, "surface" should be --surfaces--.
          line 36, delete "a" second occurrence.
          line 37, "constitue" should be --constitute--.
Column 10, line 21, "hold" should be --hole--.

Signed and Sealed this

Fourth Day of July 1978

[SEAL]

Attest:

RUTH C. MASON
Attesting Officer

DONALD W. BANNER
Commissioner of Patents and Trademarks